(12) United States Patent
Takahashi

(10) Patent No.: US 7,340,563 B2
(45) Date of Patent: Mar. 4, 2008

(54) DATA TRANSMISSION DEVICE HAVING THE SHAPE OF A STANDARD 3.5" DISK

(75) Inventor: Hironao Takahashi, Tsukuba (JP)

(73) Assignee: DTS, Inc., Ibaraki (JP)

( * ) Notice: Subject to any disclaimer, the term of this patent is extended or adjusted under 35 U.S.C. 154(b) by 316 days.

(21) Appl. No.: 11/084,894

(22) Filed: Mar. 21, 2005

(65) Prior Publication Data

US 2006/0004958 A1    Jan. 5, 2006

(30) Foreign Application Priority Data

Jul. 1, 2004    (JP) .............................. 2004-195981

(51) Int. Cl.
  *G06F 12/00*    (2006.01)
(52) U.S. Cl. ........................ 711/113; 711/143; 711/100; 711/114; 711/142; 713/169
(58) Field of Classification Search ................ 711/113, 711/114, 100, 143, 142; 713/169
See application file for complete search history.

(56) References Cited

U.S. PATENT DOCUMENTS

| | | | |
|---|---|---|---|
| 6,421,760 B1 * | 7/2002 | McDonald et al. ......... | 711/114 |
| 6,868,439 B2 * | 3/2005 | Basu et al. .................. | 709/213 |
| 2005/0097324 A1 * | 5/2005 | Mizuno ...................... | 713/169 |
| 2005/0138283 A1 * | 6/2005 | Garney ........................ | 711/113 |
| 2005/0144396 A1 * | 6/2005 | Eschmann et al. .......... | 711/143 |
| 2005/0228941 A1 * | 10/2005 | Abe et al. ................... | 711/113 |
| 2005/0278486 A1 * | 12/2005 | Trika et al. ................. | 711/142 |

FOREIGN PATENT DOCUMENTS

| | | | |
|---|---|---|---|
| JP | 05-120136 | * | 5/1993 |
| JP | 07-129327 | | 5/1995 |
| JP | 11-327797 | | 11/1999 |
| JP | 2000-047941 | | 2/2000 |
| JP | 2002-304325 | | 10/2002 |

\* cited by examiner

*Primary Examiner*—Kimberly McLean
(74) *Attorney, Agent, or Firm*—Knobbe, Martens, Olson & Bear LLP

(57) ABSTRACT

A data transmission device includes a memory cache table (4) composed of a DRAM memory, a standard 2.5" hard disk (5), a control CPU (7), a FPGA (6) (or ASIC), a disk interface (3) and a backup battery. The device is unitized in the same external shape as a standard 3.5" hard disk and connected to the external computer (2) via the disk interface (3), and the FPGA (6) (or ASIC) manages the memory in the memory cache table (4) based on control actions by the CPU (7).

6 Claims, 5 Drawing Sheets

DATA TRANSMISSION DEVICE HAVING THE SHAPE OF A STANDARD 3.5" DISK

BACKGROUND OF THE INVENTION

1. Field of the Invention

This invention relates to a device that efficiently transfers data to the hard disk from an external computer and thereby provides an effective computing environment (this device is referred to as "data transmission device," or "DTS," in this specification.

2. Description of the Related Art

The market for general-purpose computer servers is met with growing needs of late for more centralized processing at higher speeds. Conventional general-purpose computer servers perform CPU processing via an onboard local memory, and when necessary, request, store and process data from an external storage device, such as a hard disk device or silicon disk, via a system bus.

Examples of the external storage device that have traditionally been used include a hard disk device and a silicon disk using a semiconductor memory. Conventional hard disk devices have a disk head that reads data on a silicon-deposited aluminum disk, and allow for data in a given sector or block to be read when necessary.

Incidentally, the inventor had developed in the past a technology incorporating self-learning function for a direct-memory-access type server computer that uses a semiconductor memory as a data memory- to store actual data, in which the data memory recognizes as requiring fixed-area storage the addresses of data that frequently passed through during a specified sampling time, and allows such address data to reside in a fixed area of the data memory until the next sampling time is over, thereby increasing the processing speed (e.g., Laid-open Publication No. 2002-304325).

Because of their structure that incurs a seek time by the disk head, conventional hard disk devices require a very long wait time before their data can be accessed, and this has kept the overall processing speeds of computers lower. This still remains one obstacle in the improvement of overall computer performance, as it cannot be resolved simply by enhancing the CPU performance.

In other words, while conventional hard disk devices read and write data in sectors and blocks using a data-reading disk head when necessary, as explained earlier, such means is prone to lower performance when many short accesses are requested at the same time. This has resulted in poor operability of such computers.

As for conventional silicon disks that use a semiconductor memory, the available data space is limited by the capacity of the installed silicon disk, which is not enough to store an entire application. In addition, the DRAM used in these disks is a volatile data device that must be constantly supplied with power. In case of power failure, all stored data will be lost.

In an embodiment, the present invention aims to solve the above problems that have not heretofore been addressed. Specifically, it aims to significantly improve the overall performance of a computer without being limited to the performance of its hard disk and thereby solve the problem of poor retrieval performance with respect to small files, which has been an issue with conventional hard disk devices, while also resolving the problem of data loss in case of power failure as has been encountered by conventional semiconductor disks.

In other words, in an embodiment, the present invention aims to prevent the processing capability from dropping when the hard disk device is accessed from an external host computer (particularly drops in data access performance with respect to small-sized data and in random data retrieval performance), by utilizing a unique cache algorithm as well as the effect of a semiconductor memory used in a memory cache table employing the algorithm, thereby dramatically improving the retrieval capability.

SUMMARY OF THE INVENTION

To solve the above problems, in an embodiment, the present invention provides a data transmission device comprising a memory cache table composed of a DRAM memory, a standard 2.5" hard disk, a control CPU, an FPGA or ASIC, a disk interface, and a backup battery, wherein the data transmission device is unitized in the same external shape as a standard 3.5" hard disk and connects to the disk interface computer, and the FPGA or ASIC manages the memory in the memory cache table based on control actions by the CPU.

In an embodiment, the present invention also provides a data transmission device wherein the FPGA or ASIC samples access frequency per unit time for data accessed from the connected computer and then automatically learns and recognizes the priority of data based on the sampling result, and the memory cache table saves data recognized as having high access frequency and priority to allow for high-speed, efficient access to the data from the computer.

In an embodiment, the present invention also provides a data transmission device wherein the FPGA or ASIC writes data accessed from the connected computer to the memory cache table, while at the same time transfers and writes such data to the 2.5" hard disk, or transfers and writes such data to the 2.5" hard disk when the memory cache table has not been rewritten for a specified time since the last write access.

In an embodiment, the present invention also provides a data transmission device wherein the FPGA or ASIC is capable, by working with the dedicated memory management software module of the data transmission device, of identifying each connected computer attempting an access and refusing the access from a computer having no access privilege.

In at least one of the embodiments of the present invention, the data transmission device having the above configuration as proposed here produces to the following effects:

1) Allow frequently accessed data to reside in the hard disk cache area of a general-purpose hard disk. That is to say, by allowing the necessary data to reside in a memory cache table via a cache program that automatically learns the size, frequency and real-time operability of data, a high-speed CPU can effectively and constantly place in the cache memory area of its local memory those data required in CPU processing that are frequently accessed by external storage devices.

This significantly improves the overall performance of a computer without being limited by the performance of its hard disk, and also solves the problem of poor retrieval performance with respect to small files, which has been an issue with conventional hard disk devices, through the use of a dedicated semiconductor cache unit.

2) Since the data writing capability of the cache software driver allows for safe evacuation of data to a 2.5" hard disk and thus enables data to be read/written freely according to the needs of operation, the problem of data loss due to power failure, as encountered by conventional semiconductor disks, can also be resolved.

3) Since the connected external computer sees the capacity of the 2.5" hard disk for backup evacuation as the usable area (the connected external computer can use the capacity of the 2.5" hard disk (such as 40 GB) as the connected disk), high cost performance can be maintained.

4) As explained above, in an embodiment, the present invention prevents the processing capability from dropping when the hard disk device is accessed from an external host computer (particularly drops in data access performance with respect to small-sized data and in random data retrieval performance), by utilizing a unique cache algorithm as well as the effect of a semiconductor memory used in a caching part employing the algorithm, thereby dramatically improving the retrieval capability.

Description of the Symbols: 1: Data transmission device; 2: External computer; 3: Interface; 4: Memory cache table; 5: Standard 2.5" hard disk; 6: FPGA; 7: Control CPU; 8: Data bus; 9: Local memory; 10: General-purpose computer; 11: Host computer; 12: RAID controller.

DETAILED DESCRIPTION OF THE PREFERRED EMBODIMENT

The best mode for carrying out the data transmission device according to the present invention is explained below by using drawings that illustrate examples. However, the present invention is not limited to the examples or the drawings.

The data transmission device according to an embodiment of the present invention is a device that efficiently transmits (transfers) data to the hard disk from an external computer (such as a general-purpose computer or host computer), and thereby provides an effective computing environment. In this specification and relevant documents, a computer connected to the data transmission device (1) of this embodiment of the present invention is referred to as an "external computer."

Figure 1:
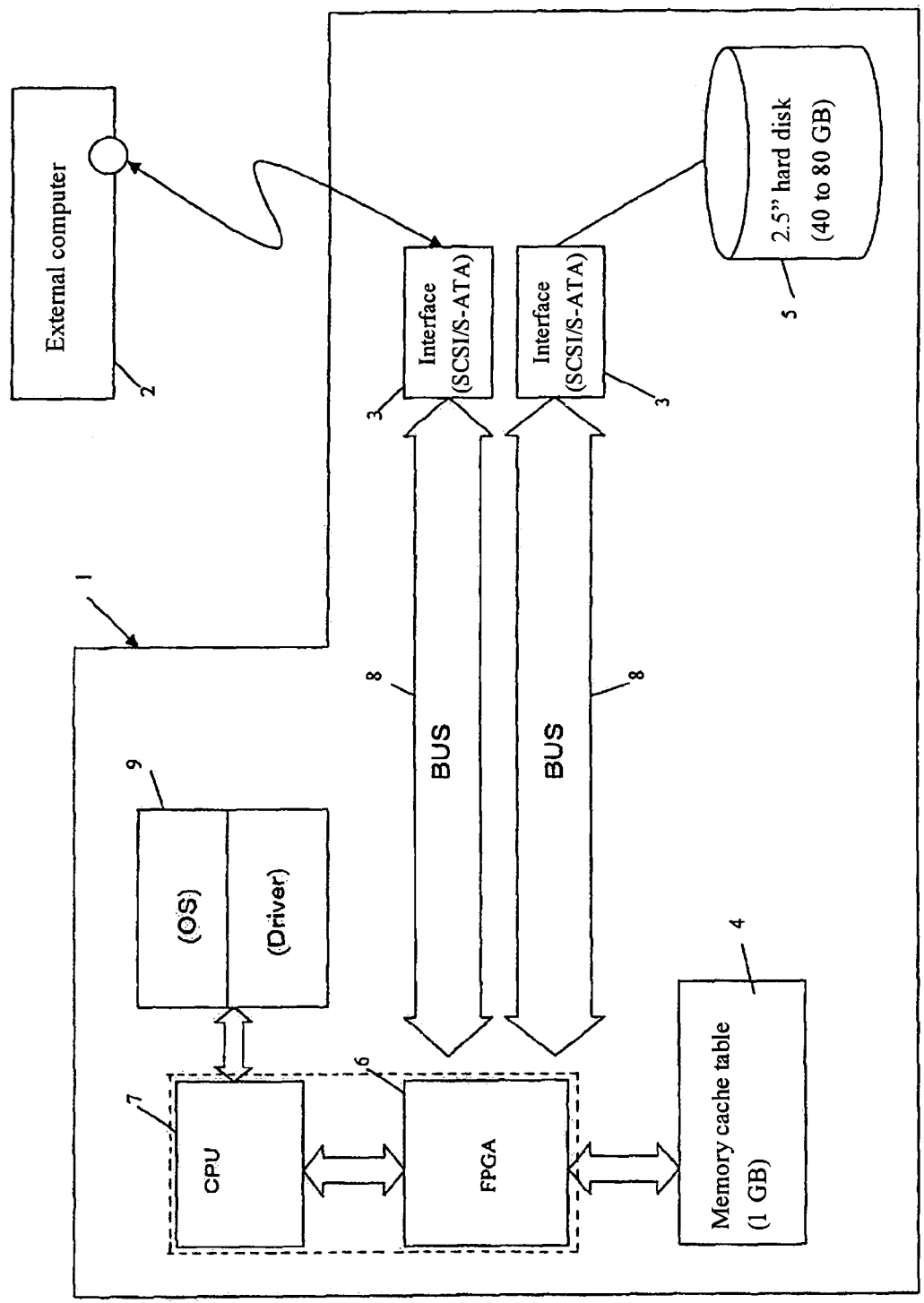
FIG. 1 is a drawing explaining the overall configuration of an example in which the data transmission device according to an embodiment of the present invention is applied.

FIG. 1 explains the overall configuration of an example of the data transmission device (1) according to an embodiment of the present invention. The data transmission device (1) of this embodiment is connected to an external computer (2) via an interface (3), and is unitized in the same external shape as a standard 3.5" hard disk.

Additionally, the data transmission device (1) of this embodiment comprises a memory cache table (4) composed of a DRAM memory (in this embodiment, this memory cache table functions as a semiconductor memory having self-learning function), a standard 2.5" hard disk (5), an FPGA (6) (may be substituted by ASIC (Application Specific Integrated Circuit), but this example uses a "FPGA"), a control CPU (7), a data bus (8), and a standard disk interface (3) (e.g., serial ATA, parallel ATA, SCSI or FC), and further comprises a backup battery (not shown). In the above, the FPGA (or SCSI) can include the control CPU.

The memory cache table and 2.5" hard disk are connected to each other via the FPGA, data bus and standard disk interface (serial ATA, parallel ATA, SCSI or FC).

On the other hand, the FPGA (6) is configured in a manner connectable to an external computer (2) via the data bus and standard disk interface (3) (serial ATA, parallel ATA, SCSI or FC). In other words, in this embodiment, the present invention provides a data transmission device (1) that has the external shape of a standard 3.5" hard disk, comprises a memory cache table (4), and is used by connecting to an external computer (2).

Any external computer (2) having a hard disk interface can utilize the device of this embodiment. In general, the data transmission device (1) of this embodiment can be utilized by means of SCSI or IDE connection.

While the FPGA (6) connects to the control CPU (7), this CPU (7) is capable of controlling the FPGA (6) and allowing it to function as the multiple modules explained below through the use of an OS or driver software stored in a local memory (9) provided proximally.

In this embodiment of the present invention, the FPGA (6) adopting a dedicated hardware logic design configures a memory control part, external communication part and bus control part, and acts as a memory management module that manages the operation of the memory cache table (4), as a bus control module that controls the data transfer on the bus, and as an external communication module. In this embodiment of the present invention, the cache algorithm software equipped with a memory management module function provided by the memory cache table (4) of the data transmission device (1) achieves a data retrieval capability several tens to several hundreds times greater than that of a conventional hard disk.

When data is written, applicable data from the external computer (2) is sent via the interface (3) and data bus (8) and written to the memory cache table (4) based on control actions by the CPU (7) and FPGA (6), and also sent and written to the 2.5" hard disk (5) via the bus (8).

As explained later, data is written to the memory cache table (4) and 2.5" hard disk (5) in two modes: either the "write through/back" mode or "write back" mode can be selected in accordance with the purpose.

When data is retrieved, a data retrieval command from the external computer (2) is sent to the CPU (7) via the interface (3), data bus (8) and FPGA (6). The CPU (7) controls the FPGA (6) to retrieve the applicable data from the 2.5" hard disk (5) and then sends the data to the external computer (2) via the data bus (8) and interface (3). At this time, the FPGA (6) caches the same data sent to the external computer (2) and saves it in the memory cache table (4).

As explained above, the data written to (cached in) the memory cache table (4) at the time of a data write or retrieval access is not only written to the memory cache table (4) via the FPGA (6) based on control actions by the CPU (7) in accordance with the unique data storage algorithm of this embodiment of the present invention as explained later, but it is also stored and maintained, and thus protected, constantly in the standard 2.5" hard disk (5).

The FPGA (6) samples the size and access frequency per unit time (frequency of access for data save and retrieval) of the data accessed from the external computer (2). Then, it automatically learns and recognizes the priority of data based on the sampled frequency per unit time at which each data is accessed.

This way, in this embodiment, the present invention allows for high-speed, efficient access from the external computer (2) by constantly saving in the memory cache table (4) those data recognized as having high access frequency and priority. As a result, an optimal access environment can be provided for the external computer (2) connected to the present device.

The control software used in this embodiment of the present invention comprises a group of dedicated software modules that operate in the Linux OS environment. By running these software modules simultaneously, data retrieval accesses from the external computer (2) can be grasped in real time, as explained earlier.

This function is utilized to sample the access frequency of data during each unit time and then find from the sampled data optimal values that allow for a significant improvement in the total retrieval/transfer performance of the system (values used for extracting only frequently accessed data and storing them in a working table to enhance the expected cache hit ratio), thereby enabling data to be retrieved at high speed in response to the next data retrieval request from the external computer (2). Hence, the memory cache table (4) is configured as a self-learning type cache table (4).

As explained above, the data transmission device (1) of this embodiment increases the possibility of many of the retrieval processing commands from the CPU resulting in a search of the same data in the memory cache table (4), because the frequency of data access from the connected external computer (2) is sampled for a specified time to constantly save and secure only frequently accessed data in the cache provided in this embodiment. As a result, the frequency of direct access to the hard disk decreases, and this in turn allows for high-speed data retrieval. Consequently, a high transaction capability can be maintained that eliminates the need for direct access to the hard disk even when retrieving a large chunk of data exceeding 4 GB that is the execution address space of a 32-bit CPU.

For the above reason, computer performance does not drop even with a computer operated in the centralized I/O mode (data input/output and write/refresh account for a larger percentage of computer processes than calculations do; particularly suitable in a multiplex communication device requiring frequent data refresh). Therefore, a computer system can be built that covers a wide range of applications regardless of the type of data used or the utilization mode such as calculation, centralized I/O or data retrieval.

Next, the cache algorithm that controls the cache operation of the memory cache table (4) according to an embodiment of the present invention is explained. The cache algorithm proposed in this embodiment has two modes, "write through/back" and "write back," and an appropriate mode can be selected according to the purpose.

Figure 3:
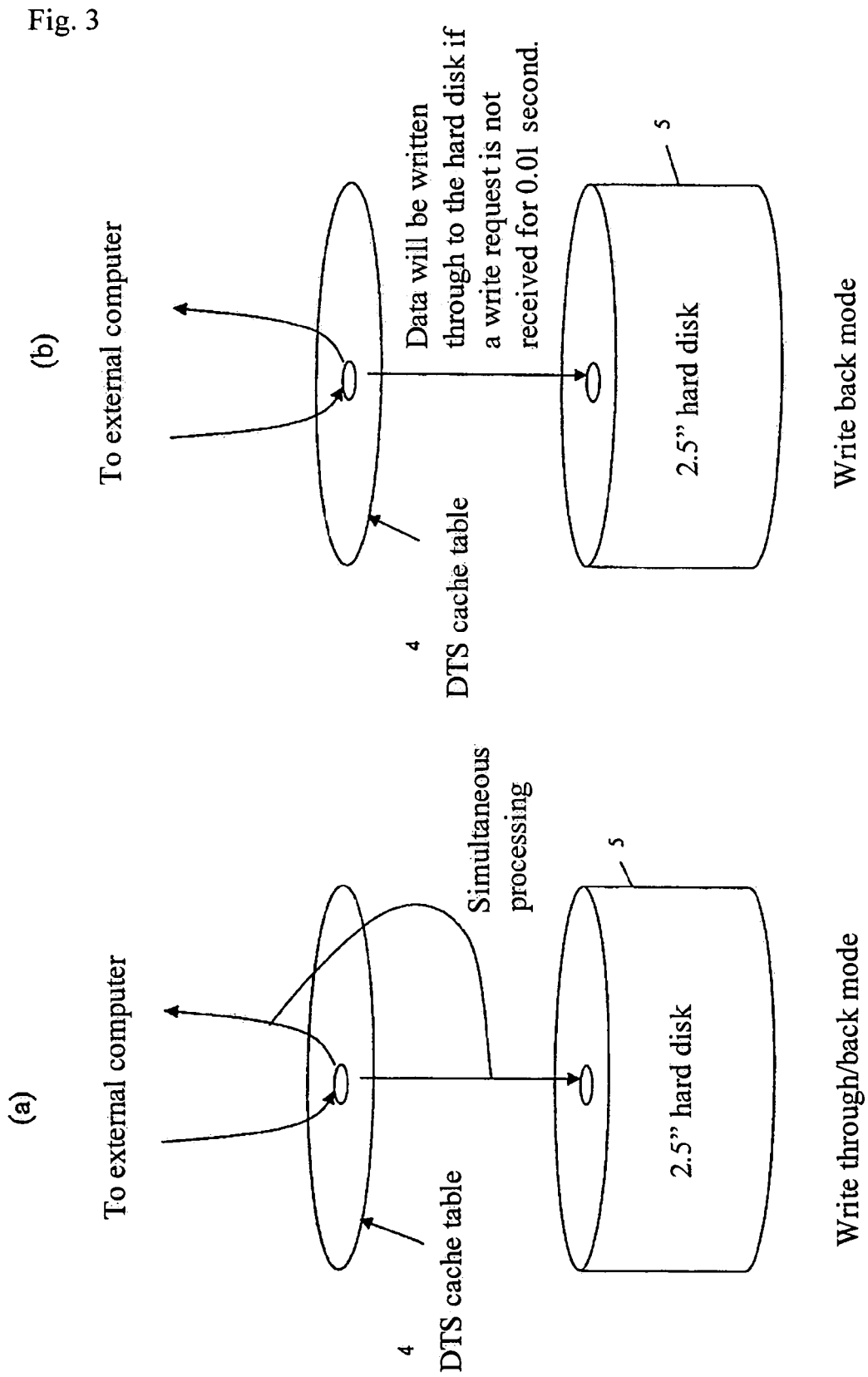
FIG. 3 is a drawing explaining the operation modes of the memory cache table in an embodiment of the present invention.

As shown in FIG. 3(a), the "write through/back mode" allows for simultaneous processing of writing of the data to the memory cache table (4) ("DTS cache table (4)" in FIG. 3(a)) and writing through of the data to the 2.5" hard disk (5).

As shown in FIG. 3(b), the "write back mode" also allows data to be written to the memory cache table (4) ("DTS cache table (4)" in FIG. 3(b)), but the data is written through to the 2.5" hard disk (5) only if the next write request is not received from the connected computer for 0.01 second (this time is referred to as the "write-through time"). This write-through time is set to 0.01 second as the standard, but any other duration can be set in a range of up to 100 minutes.

As explained above, while the data transmission device (1) proposed in this embodiment is unitized in the shape of a standard 3.5" disk containing the memory cache table (4) and 2.5" hard disk (5), all of the functions of this embodiment of the present invention are implemented in its dedicated hardware (FPGA (6) to be specific).

Figure 5:
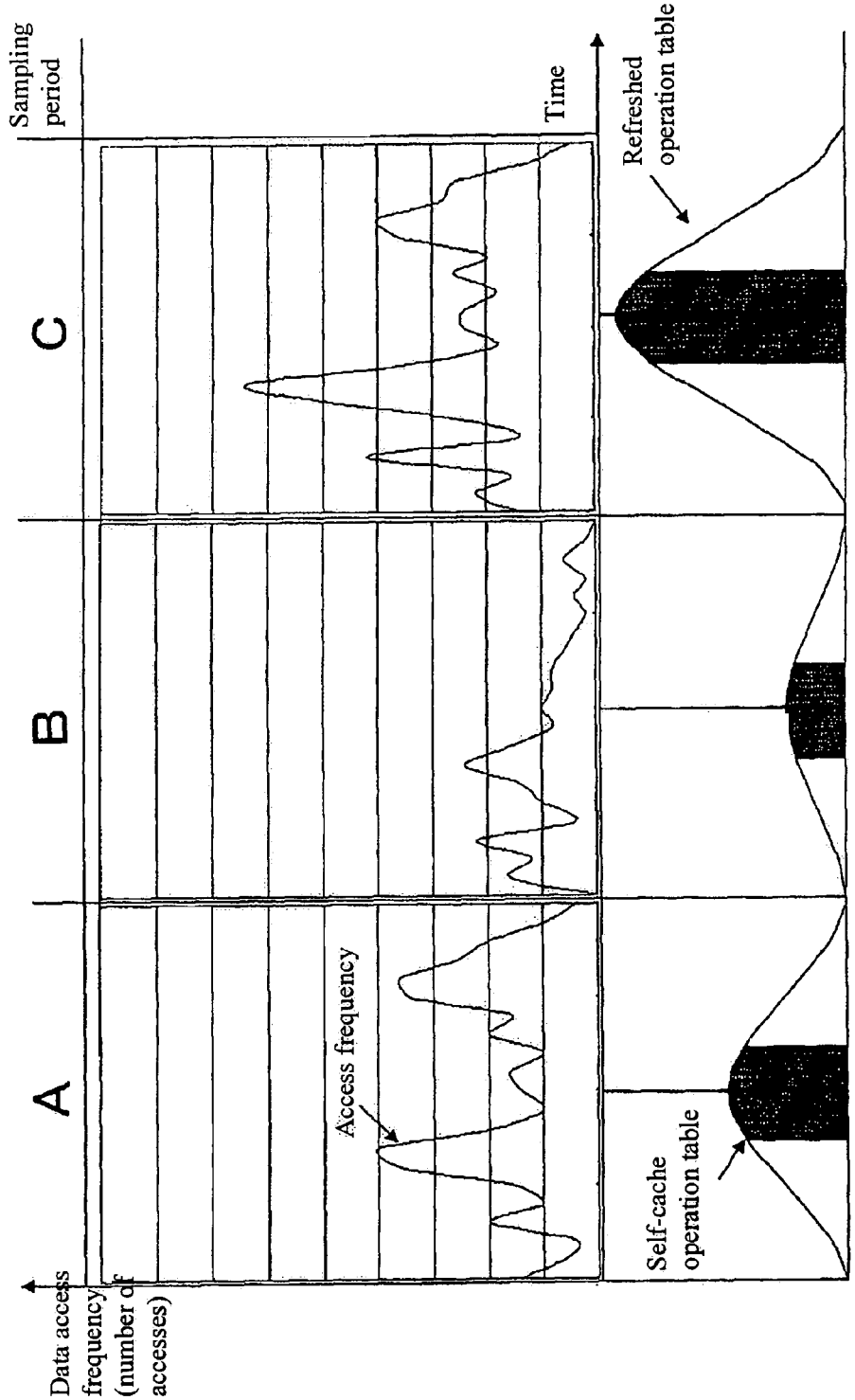
FIG. 5 is a drawing explaining the sampling table of the data transmission device according to an embodiment of the present invention.

Here, FIG. 5 is used to explain the algorithm for implementing storage cache (writing action for the purpose of caching) to the memory cache table (4) of the data transmission device (1) according to an embodiment of the present invention. The storage cache algorithm of the data transmission device (1) follows the steps specified below.

1) Set a sampling time (e.g., 1 minute). This sampling time is normally set to 1 minute, but it can be changed.

2) Plot on a specific row-column graph the block addresses of data that are retrieved through the data transmission device (1), and detect the block addresses of accessed data and their access frequencies (numbers of accesses) per unit time (refer to the top graphs in FIG. 5).

3) Generate a self-learning cache operation table based on the data (refer to the bottom graphs in FIG. 5).

4) Repeat this cycle (composed of (2) and (3)) in the three sampling periods of A, B and C, and refresh in real time and maintain the operation table (4) (the bottom graph under C in FIG. 5) based on the access frequencies obtained in the last two sampling periods (sampling periods A and B in FIG. 5).

5) Store, as the table is refreshed, the same data in the 2.5" hard disk (5) that functions as a backup storage. At this time, the data is written in the background.

6) Data of low use frequency will be written through in the next sample period without fail, but even data of high use frequency will be written through to the 2.5" hard disk (5) in the background if the present device does not receive a write request from the connected computer for 0.01 second.

In the write through/back mode, data is written to the memory cache table (4) and simultaneously written through to the 2.5" hard disk (5), as explained earlier. This means the data is protected, as it is constantly written through to the 2.5" hard disk (5) (refer to FIG. 4(a)).

In the write through mode, data determined as less frequently accessed as a result of sampling is deleted from the memory cache table (4) as necessary. However, the data is not completely erased, as it has been written through to the 2.5" hard disk (5) (refer to FIG. 4(b)).

7) Setting method: The above operation of the memory cache table (4) is implemented by way of memory management module software, and the basic cache parameters are set/incorporated at the factory.

APPLICATION EXAMPLES

Figure 2:
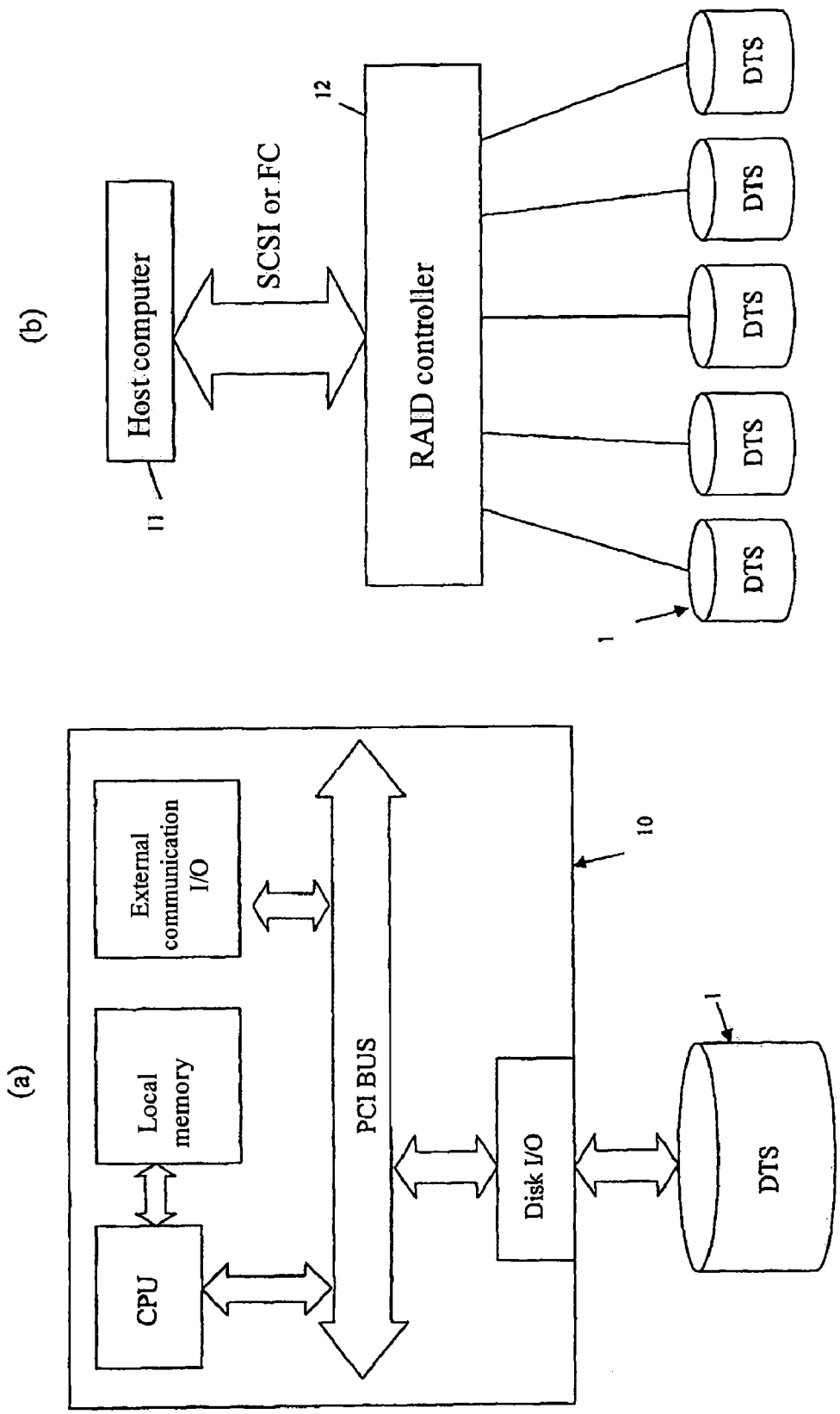
FIG. 2 is a drawing explaining the overall configuration of application examples in which the data transmission device according to an embodiment of the present invention is applied.

FIG. 2(a) and FIG. 2(b) are used to explain application examples of the data transmission device (1) according to an embodiment of the present invention (indicated as "DTS" in FIG. 2). FIG. 2(a) shows an application example in which the present device is connected to a regular general-purpose computer (10) that functions as the external computer (2) specified above. This connection may be made as an external connection, or as an internal connection with the data transmission device (1) installed in the general-purpose computer (10).

The only requirement for the general-purpose computer to be connected is to have a hard disk interface ("Disk I/O" in the figure). In general, the data transmission device (1) in this embodiment can be connected via a SCSI or IDE and the function of the memory cache table (4) that characterizes this embodiment of the present invention can be utilized.

FIG. 2(b) shows an application example in which multiple data transmission devices (1) are connected to a host computer (11) that functions as the external computer (2) specified above. In this application example, a RAID controller (12) is provided between the host computer (11) and each data transmission device (1) to provide a configuration that allows for parallel processing of data write requests (hardware RAID configuration). As shown in this application example, the present invention can be easily incorporated into an existing storage system, such as a RAID device (Redundant Array of Inexpensive Disks; a device for dividing a given data and reading/writing the data segments in parallel from/to multiple magnetic disk devices) or JBOD device (Just Bunch Of Disks; a collection of multiple disk units).

In this embodiment of the present invention, a self-learning type memory cache table (4) is provided along with a 2.5" hard disk (5) in a unit having the shape of a standard 3.5" hard disk, which allows for connection to an external computer, such as a general-purpose computer (10) or host computer (11) as shown in the above application examples. The operational benefits of this configuration are summarized below.

a) Easy incorporation into an existing general-purpose computer as an internal disk device for high-speed retrieval.

b) Complete independence of the OS or application software used by the connected computer.

c) Removability during operation and resultant easy maintenance as the device can be installed in a regular disk casing.

d) Support of a hardware RAID configuration through the provision of a separate RAID controller in the preceding stage.

e) Easy incorporation into an existing storage system (RAID or JBOD device).

The advanced extendability and security of the data transmission device (1) according to this embodiment of the present invention are explained. Two application examples of the present invention were explained in FIG. 2. Because of its adoption of the standard 3.5" hard disk shape, the data transmission device (1) according to this embodiment of the present invention is interchangeable with a wide range of computers using general hard disks.

For this reason, the data transmission device (1) according to this embodiment of the present invention can be applied in various modes in addition to those described in the application examples. If necessary, the user can also use multiple data transmission devices (1) to secure the required memory capacity. In short, in an embodiment, the present invention offers a high extendability that allows the user to benefit from the continuous advancement in the computer market.

The security performance of the device is explained. In a file server configuration receiving many accesses, data is generally read and written from/to a constantly connected hard disk device. In an embodiment, the present invention makes it possible to grant an access privilege to specific users and restrict accesses by other users.

Figure 4:
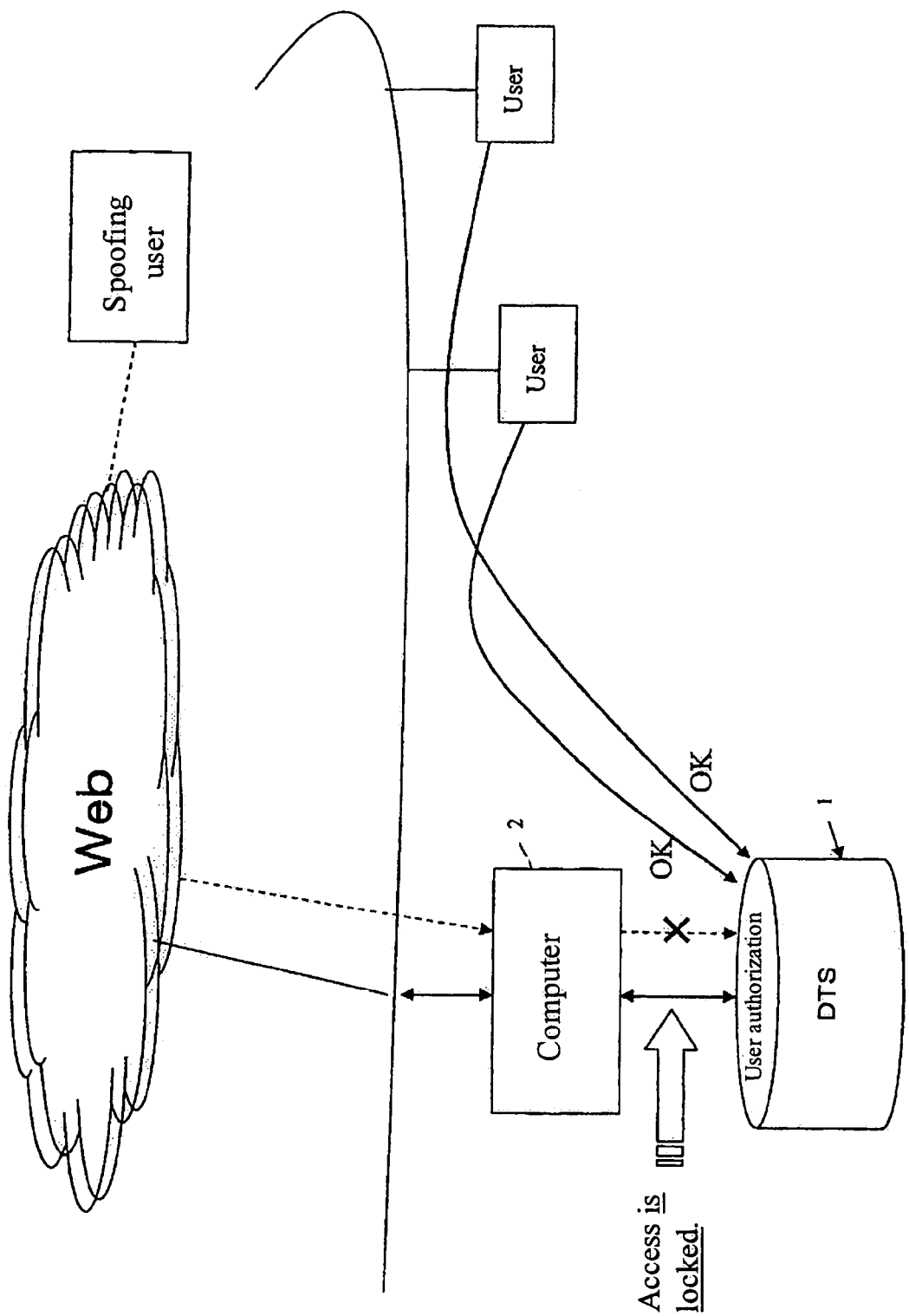
FIG. 4 is a drawing explaining the user lock function of the data transmission device according to an embodiment of the present invention.

For example, as shown in FIG. 4, consider a case where a spoofing user (who uses the ID of other user without authorization) attempts an access from the outside via an iSCSI, etc., to a file server comprising the data transmission device (1) according to an embodiment of the present invention (indicated as "DTS" in FIG. 4). Since the iSCSI itself permits data in the hard disk to be accessed directly, conventional servers had the problem of relatively low security against data theft by intruders. In an embodiment, by using the present invention, however, an access request from a user having no access privilege can be denied, even when the request is made via an iSCSI, if the administrator sets the device to deny third-party accesses. This prevents unauthorized disclosure of data.

Conventional computers have had to rely on the approach of setting access privileges for users and then using dedicated software to monitor access privileges and implement security functions on the basis of access privileges. One key benefit in an embodiment of the present invention is that this management/control of access privileges can be performed in the disk device storing the actual data. This ensures stepped-up security even when the physical disk is stolen.

The foregoing explained examples illustrating the best mode for carrying out the data transmission device according to the present invention. Needless to say, the present invention is not limited to these examples, and various other applications may be feasible within the limits allowed by the technologies described under "Scope of Claims."

Having at least one of the configurations described above, the present invention can be utilized for home or business use by connecting to a general-purpose computer, a host computer, or any of the variety of server computers such as a proxy server.

What is claimed is:

1. A data transmission device comprising:
   a local memory including a driver,
   a memory cache table composed of a DRAM memory,
   a standard 2.5" hard disk,
   an FPGA or ASIC for managing the memory in the memory cache table,
   a control CPU for controlling the FPGA or ASIC, said control CPU being controlled by the driver,
   a disk interface for connecting to an external computer, and
   a backup battery,
   all of the local memory, the memory cache table, the standard 2.5" hard disk, the control CPU, the FPGA or ASIC, the disk interface, and the backup battery being packed as a unit in the same external configuration and size as a standard 3.5" hard disk,
   wherein
   the FPGA or ASIC works with the driver via the CPU to sample an access frequency per unit time of date accessed by the connected external computer, then automatically learns importance of the accessed data based on the sampled frequency, and save data having high importance in the memory cache table in real time so as to allow for high-speed, efficient access to the data from the external computer.

2. The data transmission device as described in claim 1, wherein the FPGA or ASIC works with a dedicated memory management software module of the data transmission device to write data accessed from the connected computer to the memory cache table, and at the same time transfer and write said data to the 2.5" hard disk.

3. The data transmission device as described in claim 1, wherein the FPGA or ASIC works with a dedicated memory management software module of the data transmission device to write data accessed from the connected computer to the memory cache table, and then transfer and write said data to the 2.5" hard disk when the memory cache table has not been rewritten for a specified time since said write access.

4. The data transmission device as described in claim 1, wherein the FPGA or ASIC is capable, by working with a dedicated memory management software module of the data transmission device, of identifying each connected computer attempting an access and refusing the access from a computer having no access privilege.

5. The data transmission device as described in claim 1, wherein the FPGA or ASIC that works with the driver has a first writing mode of writing data accessed by the connected computer in the memory cache table and at the same time transferring and writing said data in the 2.5" hard disk, and a second writing mode of writing data accessed by the connected computer in the memory cache table and then transferring and writing said data in the 2.5" hard disk when the no data have been written from the connected computer in the memory cache table for a given time period since said data were accessed by the connected computer, wherein the first and second writing modes are switchable.

6. The data transmission. device as described in claim 5, wherein the FPGA or ASIC is capable, by working with the driver, of identifying each connected computer attempting access to data and refusing the access from a computer having no access privilege.

* * * * *